(12) United States Patent
Yoder et al.

(10) Patent No.: US 10,234,043 B2
(45) Date of Patent: Mar. 19, 2019

(54) WELDABLE, LOW LEAD AND LEAD-FREE PLUMBING FITTINGS AND METHODS OF MAKING THE SAME

(71) Applicant: NIBCO INC., Elkhart, IN (US)

(72) Inventors: Keith Yoder, Syracuse, IN (US); Benjamin L. Lawrence, Elkhart, IN (US); David Andrew Bobo, Granger, IN (US); Matthew J. Krazit, Goshen, IN (US)

(73) Assignee: NIBCO INC., Elkhart, IN (US)

( * ) Notice: Subject to any disclaimer, the term of this patent is extended or adjusted under 35 U.S.C. 154(b) by 0 days.

(21) Appl. No.: 15/402,582

(22) Filed: Jan. 10, 2017

(65) Prior Publication Data
US 2017/0204979 A1     Jul. 20, 2017

Related U.S. Application Data

(60) Provisional application No. 62/279,969, filed on Jan. 18, 2016.

(51) Int. Cl.
| | |
|---|---|
| *F16K 5/06* | (2006.01) |
| *F16K 3/02* | (2006.01) |
| *F16K 27/04* | (2006.01) |
| *F16K 27/06* | (2006.01) |
| *F16K 27/10* | (2006.01) |

(52) U.S. Cl.
CPC .......... *F16K 5/0657* (2013.01); *F16K 3/0263* (2013.01); *F16K 27/044* (2013.01); *F16K 27/067* (2013.01); *F16K 27/105* (2013.01); *F16K 27/107* (2013.01)

(58) Field of Classification Search
CPC .... F16K 5/0657; F16K 3/0263; F16K 27/044; F16K 27/067; F16K 27/105; F16K 27/107
USPC ............ 251/315.1, 326, 329, 368, 366, 367; 29/890.12
See application file for complete search history.

(56) References Cited

U.S. PATENT DOCUMENTS

| | | | | |
|---|---|---|---|---|
| 3,411,746 A | * | 11/1968 | Scaramucci | F16K 5/0673 137/15.22 |
| 4,049,186 A | | 9/1977 | Hanneman et al. | |
| 4,260,134 A | * | 4/1981 | Ripert | F16K 27/105 251/329 |
| 5,711,474 A | | 1/1998 | Hummel | |

(Continued)

FOREIGN PATENT DOCUMENTS

| | | |
|---|---|---|
| EP | 1134053 A1 | 9/2001 |
| EP | 2194150 B1 | 1/2013 |

*Primary Examiner* — Kevin Murphy
*Assistant Examiner* — Kelsey Cary
(74) *Attorney, Agent, or Firm* — Price Heneveld LLP

(57) ABSTRACT

A plumbing fitting that includes: a fitting body having a plurality of ends; and a cover element joined to the body with a weld in proximity to and spaced from an interface in contact with a potable or non-potable aqueous medium. The body and the cover element are fabricated from a lead-free or low lead, copper or copper-silicon alloy having a thermal conductivity of ≤45 W/(m*K). Further, the weld has a centerline that is ≤6.4 mm from the interface and/or a heat affected zone that has an average width ≤400 μm and is spaced from the interface. The plumbing fittings include but are not limited to ball valves, gate valves, elbows, check valves and other fittings without stems.

18 Claims, 13 Drawing Sheets

(56) References Cited

U.S. PATENT DOCUMENTS

| | | |
|---|---|---|
| 7,066,375 B2 | 6/2006 | Bolser |
| 7,618,503 B2 | 11/2009 | McCrink et al. |
| 7,776,163 B2 | 8/2010 | Xu et al. |
| 8,273,193 B2 | 9/2012 | Xu et al. |
| 2002/0064678 A1 | 5/2002 | Kiyotoki et al. |
| 2009/0008590 A1* | 1/2009 | Wang .................... F16K 5/0642 251/315.01 |
| 2010/0273570 A1* | 10/2010 | Ines ..................... A63B 53/047 473/342 |
| 2011/0072976 A1 | 3/2011 | Volonte et al. |
| 2014/0021176 A1 | 1/2014 | Fuhrmann |
| 2014/0048629 A1 | 2/2014 | McFarland |
| 2014/0090714 A1* | 4/2014 | Bobo ........................ F17D 1/00 137/1 |
| 2014/0273667 A1* | 9/2014 | Tachibana ............ H01R 43/048 439/877 |

\* cited by examiner

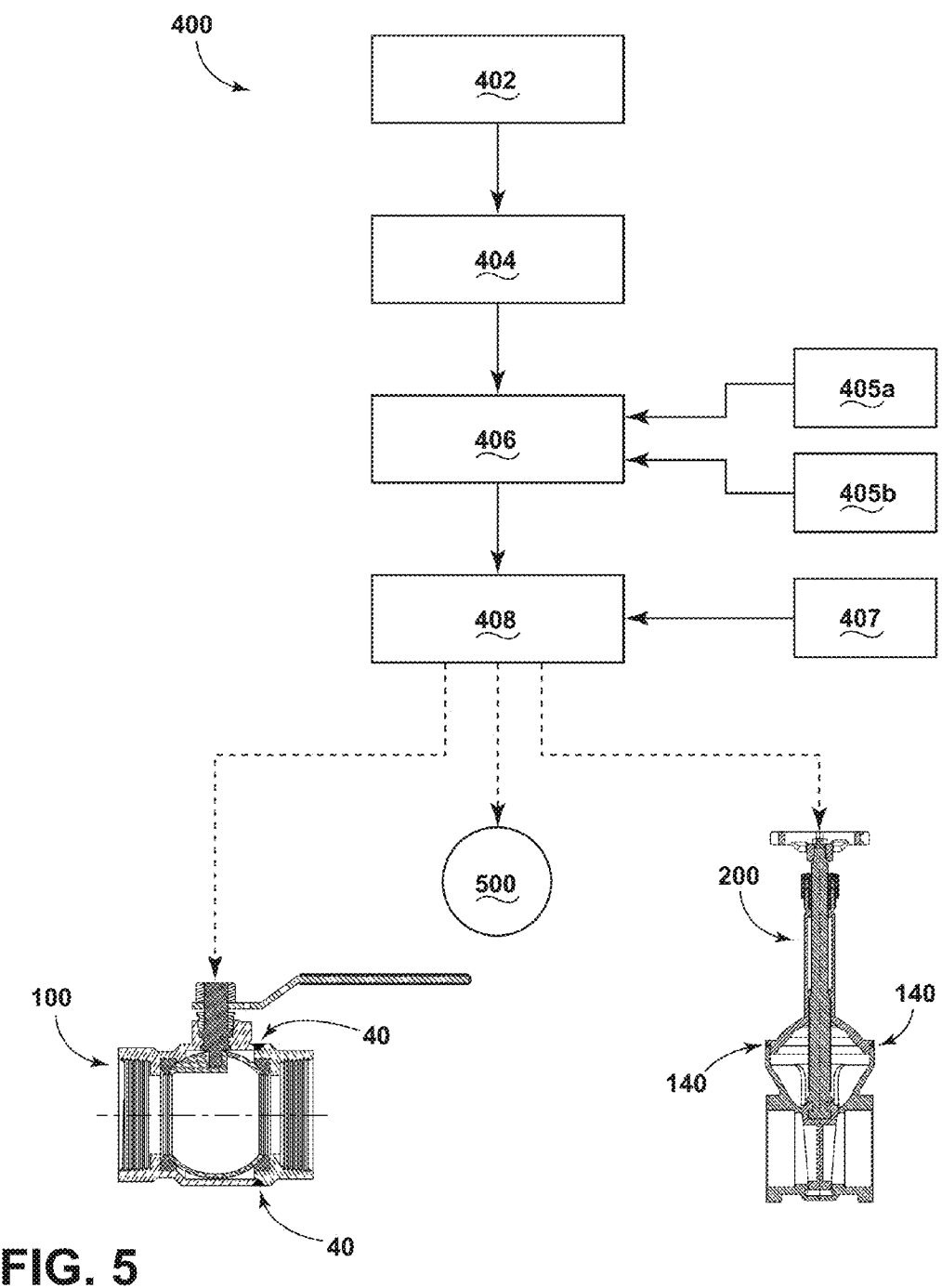

WELDABLE, LOW LEAD AND LEAD-FREE PLUMBING FITTINGS AND METHODS OF MAKING THE SAME

CROSS-REFERENCE TO RELATED APPLICATION

This application claims the benefit of priority under 35 U.S.C. § 119 of U.S. Provisional Application Ser. No. 62/279,969, filed on Jan. 18, 2016, the contents of which is relied upon and incorporated herein by reference in its entirety.

TECHNICAL FIELD

This disclosure generally relates to weldable, low lead and lead-free plumbing fittings and methods of making the same, particularly valve assemblies for use with potable and non-potable aqueous media fabricated from silicon-copper and copper alloys.

BACKGROUND

In recent years, in order to reduce exposure of individuals to lead in their water supply systems, federal and state government agencies have issued regulations that provide standards for acceptable levels of lead in drinking water and the amount of lead that can leech from plumbing fittings. In order to meet these specifications, several low lead or lead-free alloys are now being employed in plumbing fixtures.

Plumbing fittings, such as valves, typically have valve bodies which are machined in two parts for ease of assembly. Valves, such as ball valves, typically have a body section into which the valve ball and valve stem are first inserted followed by an end cover which is threaded into the internally threaded valve body.

Typically, lead-free alloys are more difficult to machine than conventional lead-containing bronze alloys. Many low lead and lead-free alloys are abrasive, have higher tensile and yield strengths, require more costly tooling, result in shorter tool life upon machining and require increased energy consumption during manufacturing compared to lead-containing alloys. As a result, threads between the valve body and the end cover, when fabricated from low lead and lead-free alloys, are difficult and costly to machine in view of the material properties of these alloys. This, in turn, greatly increases the cost of manufacturing valves and various plumbing fittings in a traditional manner.

Engagement of low lead and lead-free copper alloy threads in fittings also presents challenges with respect to achieving and maintaining a good seal at the joints made with these threads. In contrast, the lead in leaded alloys would smear along the faces of the threads upon machining, thus providing a lead film that would lubricate and level out irregularities between mating surfaces. As a result, leaded alloys could facilitate higher thread engagement torques and excellent sealing capabilities. With the reduction and/or loss of lead in the low lead and lead-free copper alloy fittings, these inherent benefits of lead are lost. Not surprisingly, low lead and lead-free alloys can result in fitting designs with poor thread connections due to the relatively high strength and low ductility of these alloys. Further, these thread engagement issues with low lead and lead-free alloys become even more pronounced in high temperature applications, such as steam, where there is a potential for thermal expansion to impact mating components and create leak paths.

In general, welded joints are generally viewed as improvement over threaded joints in plumbing fittings and valves. While welding processes are generally understood to be lower in cost than machining processes used to make threaded features in valves, fittings and the like, welding has not been successfully employed to date to join valves, fittings and the like fabricated from lead-free and low lead alloys. Among other considerations, the low lead and lead-free alloys in such fittings and valves possess material properties that have inhibited the development and optimization of welding processes for these fittings and valves.

Weld joints employed with components fabricated from copper alloys typically exhibit a heat affected zone ("HAZ"). With regard to in-service corrosion resistance, the HAZ, when in contact with a corrosive media within the fitting (e.g., potable water), can exacerbate any leaching of alloy constituents from the fitting (e.g., small amounts of lead, other metals, and other constituents) into the corrosive media. Further, the HAZ itself can result in a degradation of the mechanical properties of the fitting, particularly portions of the fitting in proximity to the HAZ. Further, the HAZ of the weld joint can enhance the local corrosion rates of any portion of the HAZ in proximity to or contact with the corrosive media of the plumbing fitting.

Accordingly, there is a need for low lead and lead-free plumbing fitting designs for use with potable and non-potable aqueous media (and methods of making these fittings) with components that can be joined with welds that resist corrosion and exhibit high mechanical integrity. There is also a need for fitting designs, and welding methods for making these fittings, that optimize the size and location of the HAZ in view of the material properties of the components of the fitting and in-service corrosion resistance.

BRIEF SUMMARY

According to one aspect of the disclosure, a plumbing fitting is provided that includes: a stem; a valve body for receiving a stem and a valve, the body having a plurality of ends; and a cover element joined to the body with a weld in proximity to and spaced from an interface in contact with a potable or non-potable aqueous medium. The body and the cover element are fabricated from a lead-free or low lead, copper-silicon or copper alloy having a thermal conductivity of ≤45 W/(m*K). Further, the weld has a centerline that is ≤6.4 mm from the interface.

According to another aspect of the disclosure, a plumbing fitting is provided that includes: a stem; a valve body for receiving a stem and a valve, the body having a plurality of ends; and a cover element joined to the body with a weld in proximity to and spaced from an interface in contact with a potable or non-potable aqueous medium. The body and the cover element are fabricated from a lead-free or low lead, copper-silicon or copper alloy having a thermal conductivity of ≤45 W/(m*K). Further, the weld has a heat affected zone that has an average width ≤400 μm and is spaced from the interface.

According to a further aspect of the disclosure, a plumbing fitting is provided that includes: a fitting body having a plurality of ends; and a cover element or an end element joined to the body with a weld in proximity to and spaced from an interface in contact with a potable or non-potable aqueous medium. The body, and the cover element or the end element, are fabricated from a lead-free or low lead, copper-silicon or copper alloy having a thermal conductivity of ≤45 W/(m*K). Further, the weld has a heat affected zone that has an average width ≤400 μm and is spaced from the interface.

Certain aspects of the foregoing plumbing fittings possess one or more welds joining the cover element to the valve (or fitting) body with a centerline of about 7 mm or less from an interface of the plumbing fitting in contact with a potable or non-potable aqueous medium. Other aspects of the foregoing plumbing fittings possess one or more such welds with a centerline of about 6 mm or less, about 5 mm or less, about 4 mm or less, about 3 mm or less, about 2 mm or less, about 1 mm or less, and all values between these upper limits from the interface.

Further aspects of the foregoing plumbing fittings possess one or more welds that include a heat affected zone ("HAZ") that has an average width of less than or equal to 800 μm, less than or equal to 700 μm, less than or equal to 600 μm, less than or equal to 500 μm, less than or equal to 400 μm, less than or equal to 300 μm, less than or equal to 200 μm, less than or equal to 100 μm, less than or equal to 50 μm, and all values between these width limits.

Additional aspects of the foregoing plumbing fittings include a cover element and a valve (or fitting) body fabricated from a lead-free or low lead, copper-silicon or copper alloy having a thermal conductivity of about 45 W/(m*K) or less, 40 W/(m*K) or less, 35 W/(m*K) or less, 30 W/(m*K) or less, 25 W/(m*K) or less, 20 W/(m*K) or less, 15 W/(m*K) or less, 10 W/(m*K) or less, 5 W/(m*K) or less, and all values between these limits.

A further aspect of the disclosure is a method of making a plumbing fitting that includes the steps: inserting a valve into a valve body; inserting a stem into the valve and the valve body; arranging a cover element in close proximity to the valve body to define an interface, the interface being in contact with a potable or non-potable aqueous medium; and welding the cover element to the valve body. The welding is conducted to form a weld located in proximity to and spaced from the interface, the weld further comprising a centerline that is ≤6.4 mm from the interface. Further, the body and the cover element are fabricated from a lead-free or low lead, copper-silicon or copper alloy having a thermal conductivity of ≤45 W/(m*K).

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 5 is a schematic flow chart of a method of making a plumbing fitting according to another embodiment of the disclosure.

DETAILED DESCRIPTION

Figure 1A:
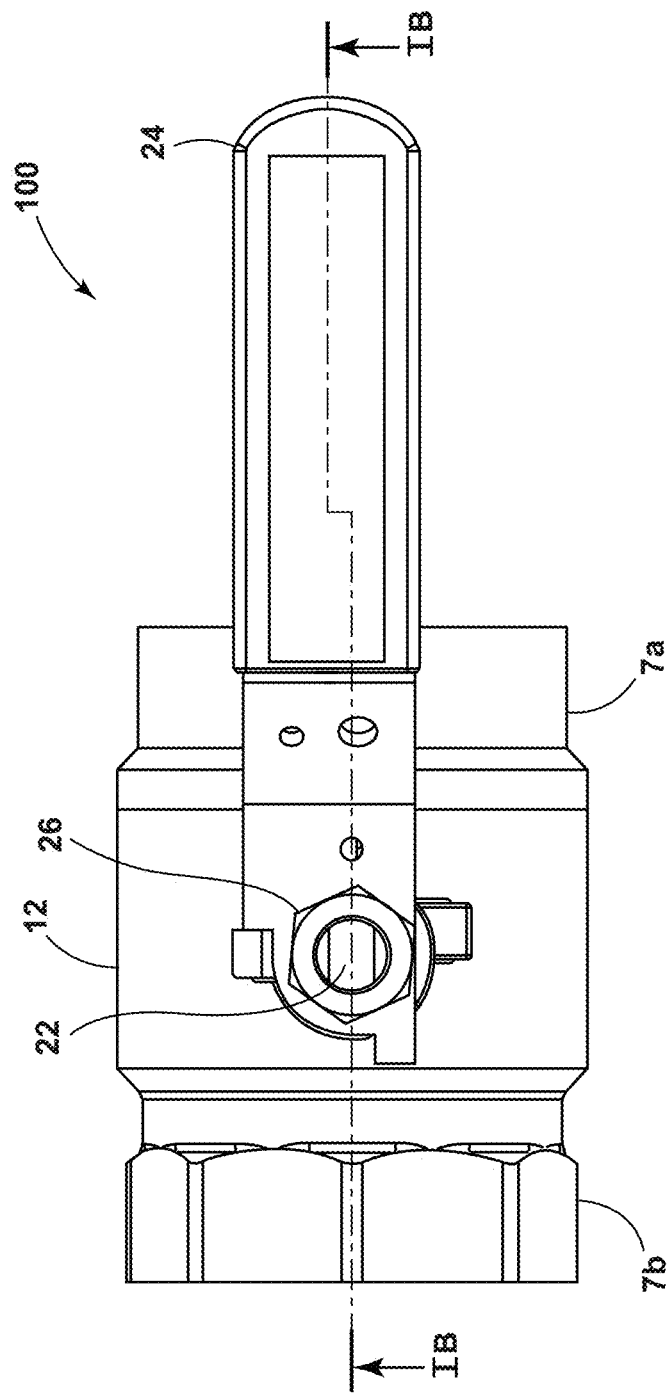
FIG. 1A is a top plan view of a ball valve assembly constructed according to an embodiment of the disclosure.
Figure 1B:
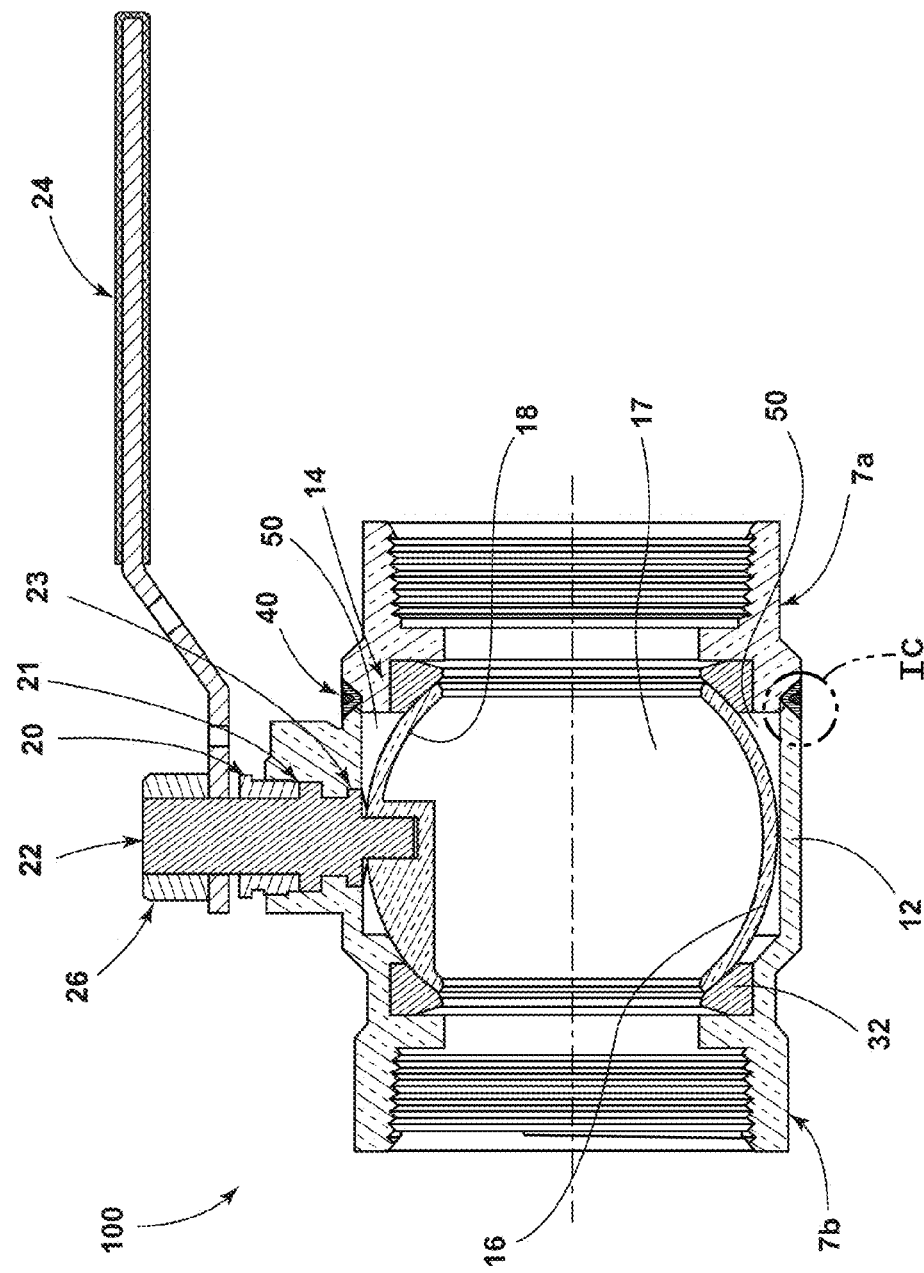
FIG. 1B is a vertical cross-sectional view of the ball valve assembly shown in FIG. 1A, taken along section lines IB-IB.
Figure 2A:
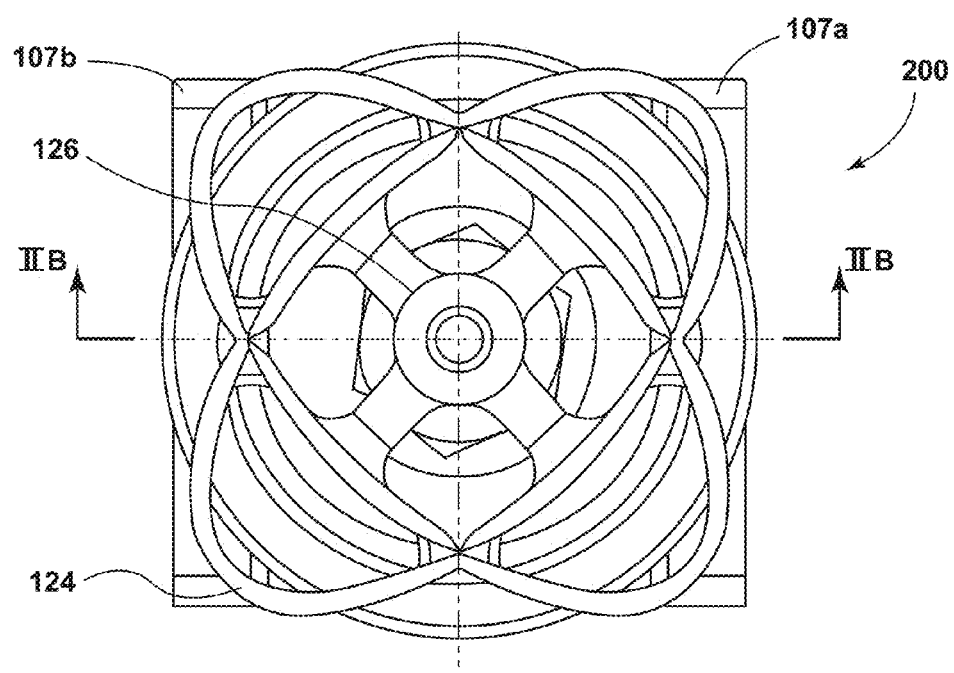
FIG. 2A is a top plan view of a gate valve assembly constructed according to an embodiment of the disclosure.
Figure 2B:
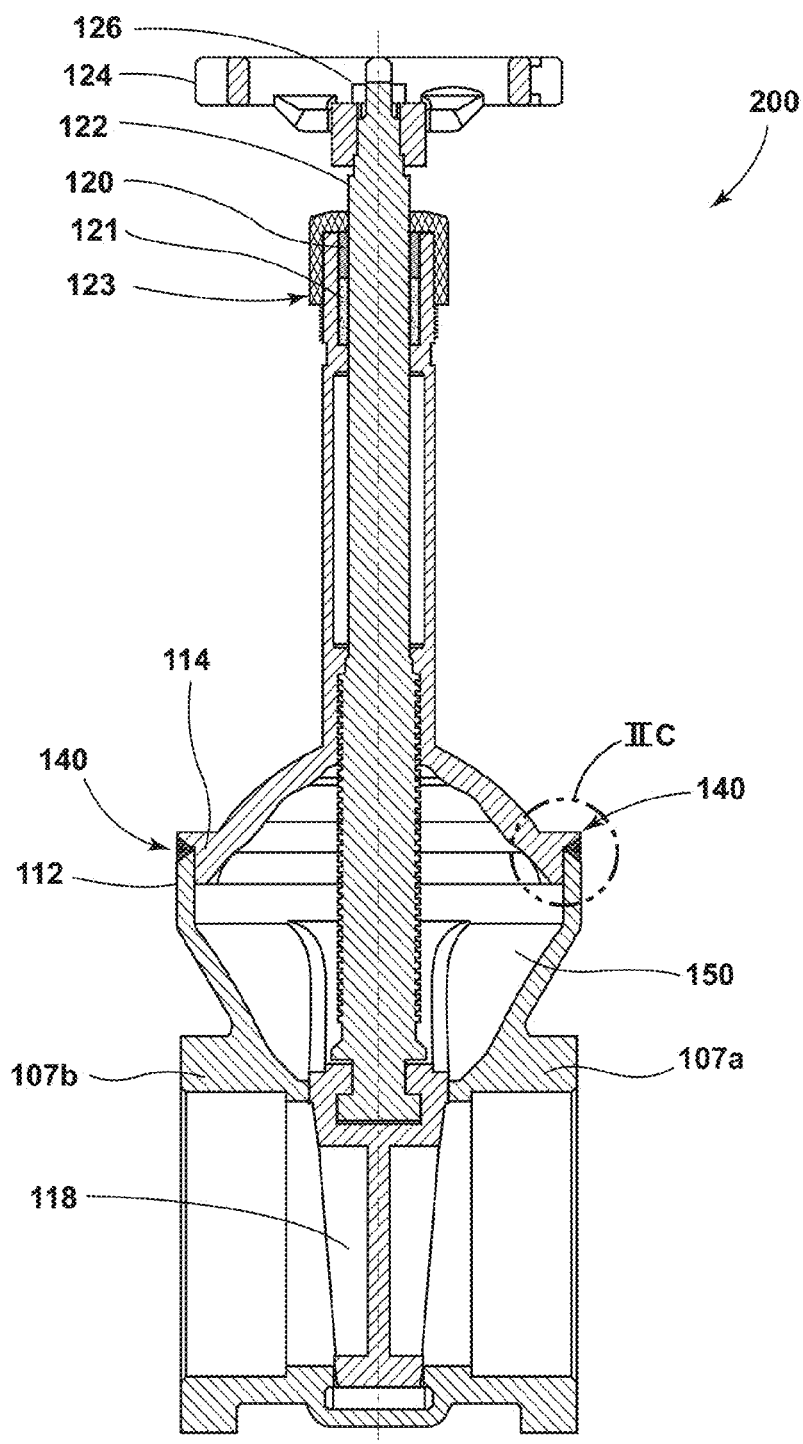
FIG. 2B is a vertical cross-sectional view of the gate valve assembly shown in FIG. 2A, taken along section lines IIB-IIB.

For purposes of description herein, the terms "upper," "lower," "right," "left," "rear," "front," "vertical," "horizontal," and derivatives thereof shall relate to the invention as oriented in FIGS. 1B and 2B. However, the invention may assume various alternative orientations, except where expressly specified to the contrary. Also, the specific components, assemblies, devices and methods illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Certain recitations contained herein refer to a component being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

The disclosure is directed to plumbing fittings (and methods of making these fittings) for use with potable and non-potable aqueous media with components that can be joined with welds, or otherwise contains welds, that resist corrosion and exhibit mechanical integrity. Such plumbing fittings include but are not limited to ball valves, gate valves, check valves, elbows and other fittings without stems. Some or all of the primary components of these plumbing fittings (e.g., cover element, valve body, etc.) can be fabricated from copper and silicon-copper alloys. In addition, these plumbing fitting designs can achieve corrosion resistance and mechanical integrity through control of the weld location, extent of its heat affected zone (HAZ), and/or the extent of a cover element flange incorporated within the cover element to protect the weld.

In general, the control of the weld location, extent of its HAZ and size of a cover element flange employed in the fitting can be achieved through selection of particular welding parameters, component material properties, dimensioning of the component interfaces to be joined by the weld and/or size control of the HAZ. Upon welding, the volume and duration of energy input (heat) combined with the relative thermal diffusivity of the components to be joined can be factored into design parameters to drive the size and shape of the HAZ. As understood by those with ordinary skill in the field of the disclosure, the term "thermal diffusivity" associated with a material is defined as the thermal conductivity of that material divided by its density and specific heat capacity, i.e., the tendency of a material to conduct versus store thermal energy. Aspects of the disclosure match the magnitude of energy delivered to the weld with an appropriate composition, in view of its thermal properties including thermal diffusivity and/or thermal conductivity, to create an appropriate spacing distance from the weld centerline to portions of the fitting in contact with potentially corrosive potable and non-potable aqueous media. Further, this spacing distance can be adjusted by adjusting the size of a cover element flange employed in the fitting.

Without being bound by theory, the weld and adjoining HAZ experience changes associated with the heating and cooling from the welding process, particularly the energy and heat inputs. These changes include phase transformations, microstructural changes and the development of varied properties in distinct weld zones. The spacing (e.g., as provided by a cover element flange) between the weld centerline and contact point with aqueous media is set to encompass the HAZ and the full body of the weldment, while also providing additional material to serve as a protective barrier or buffer region between the aqueous media and the full body of the weldment and the HAZ. As used herein, "the full body of the weldment" is defined in terms of weld zones that radiate out from the centerline of the weld and terminate at some distance into the base metal that is unaffected by the weld. The body of the weldment, in some embodiments, progresses from the centerline of the weld to the base metal in the following order: 1) solidified weld from molten metal developed during the welding process; 2) liquid-to-solid transition region; (3) solid grain growth region; 4) solid recrystallization region; 5) solid partially transformed region; and 6) solid tempered region. The cover element flange is intended to provide protection of the weld zone(s) that are in some way negatively sensitized to the aqueous media.

According to some aspects of the plumbing fittings of the disclosure, a plumbing fitting design is provided in which a physical barrier in the form of a flange (or similar structure) exists between the butted members to be joined, i.e., the centerline of the weldment and the potentially corrosive potable or non-potable aqueous media. In general, embodiments of the fittings (and methods for making them) of the disclosure can effectively set the distance between the centerline of a weldment and the potable or non-potable aqueous media to ensure that any incomplete portions of the weld and/or the HAZ are not in contact with the media.

Figure 1C:
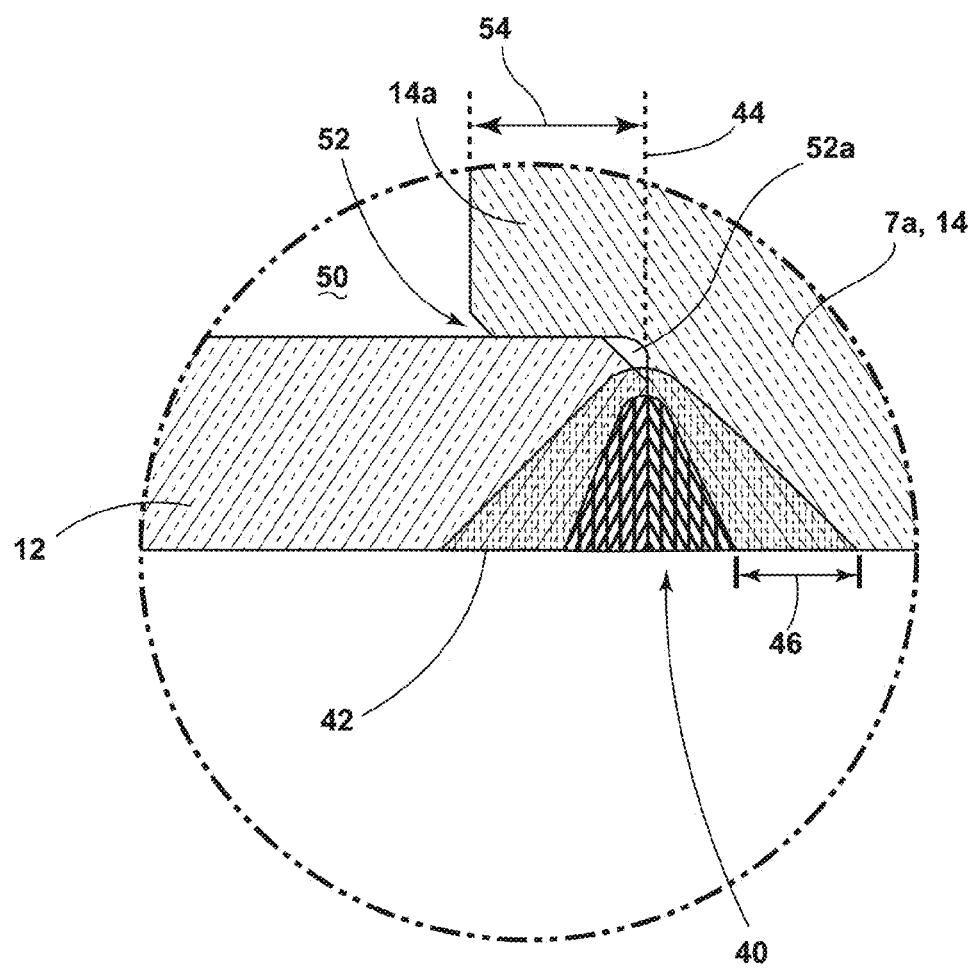
FIG. 1C is an enlarged detailed view of area IC of the ball valve assembly shown in FIG. 1B.

Referring to FIGS. 1A, 1B and 1C, a plumbing fitting 100 in the form of a ball valve is depicted that includes a stem 22 and a valve body 12 for receiving the stem. The valve body 12 has a plurality of ends, namely ends 7a and 7b (see FIGS. 1A and 1B). Plumbing fitting 100 includes a cover element 14 (e.g., in the form of an end cover, as shown in FIG. 1B) that is joined to the valve body 12 with a weld 40. Further, the weld 40 is located in proximity to and/or spaced from an interface 52 (see FIG. 1C) that is in contact with a potable or non-potable aqueous medium (not shown) that can flow through and/or reside within the waterway 17 and waterway portion 50.

In the aspect of plumbing fitting 100 depicted in FIGS. 1A, 1B and 1C, the fitting is a ball valve with a spherical aperture 16 having one more seal elements 32 (e.g., glass-filled polytetrafluoroethylene ("PTFE")) for receiving a ball 18. The valve body 12 also includes an aperture 20 for receiving a valve stem 22 that is coupled to the ball 18 and rotatable by a handle 24. In addition, the handle 24 can be conventionally coupled to the valve stem 22 and secured by a locking nut 26. Further, the valve stem 22 can be configured with stem packing 21 and a thrust washer 23 (see FIG. 1B). In operation, rotation of the handle 24 rotates the ball 18 between a position shown in FIG. 1B, in which the valve (i.e., plumbing fitting 100) is open to allow the flow of the potable or non-potable aqueous media to a position rotated about 90° in which the waterway 17 in the ball 18 is enclosed or otherwise restricted by solid walls associated with the ball 18.

The plumbing fitting 100 includes a valve body 12 that possesses at least two ends, namely, inlet 7a and outlet 7b as depicted in FIG. 1B. One or both of the ends 7a and 7b can be threaded to allow connection to a conventional threaded pipe fitting. In configurations of the plumbing fitting 100 with one or more unthreaded ends, a pipe connection can be made through an alternative joining approach, such as soldering or brazing.

Further, the primary components of the plumbing fitting 100, including the valve body 12 and the cover element 14, can be fabricated from a lead-free, copper-silicon alloy. Suitable alloys include C87600, C87850, C69400 and other low lead or lead-free bronze compositions. For example, a C69400 composition can be employed for the valve body 12 and the cover element 14 which comprises: 80.59% Cu, 14.8% Zn, 4.42% Si, and 0.066% Pb (by weight). As used herein, "low lead" and "lead-free" alloys employed in the fabrication of the valve body 12 and the cover element 14 contain lead in an amount of less than about 1% by weight and less than 0.25% by weight, respectively. In certain preferred aspects of the plumbing fitting 100, the alloy or alloys employed to fabricate the valve body 12 and the cover element 14 contain less than 0.1% lead by weight or, in some cases, no more than trace levels of lead.

Referring to FIGS. 1B and 1C, the plumbing fitting 100 includes a weld 40 that joins the inlet end 7a of the cover element 14 to the valve body 12. Further, as shown particularly in FIG. 1C, the weld 40 has a centerline 44 substantially coincident with a chamfered region 52a and that is in proximity to the interface 52, i.e., as defined at the edge of the cover element flange 14a. In certain aspects, the weld 40 has a centerline 44 set at a distance 54 of no greater than 10 mm from the interface 52. In other aspects, the centerline 44 of the weld 40 resides at a distance 54 of no greater than 9 mm, 8 mm, 7 mm, 6 mm, 5 mm, 4 mm, 3 mm, 2 mm, 1 mm, 0.5 mm and all values between these upper limits, from the interface 52. In a further aspect, the centerline 44 of the weld 40 is set at a distance 54 of no greater than 6.4 mm, or no greater than 2.5 mm, from the interface. As depicted in FIGS. 1B and 1C, the configuration of the cover element 14 with end 7a and the valve body 12 in proximity to the interface 52 and weld 40, along with the size of the cover element flange 14a, can be arranged to control the location of the centerline 44 of the weld 40 and/or increase the extent of corrosion protection afforded by the flange 14a over the chamfered region 52a. It should also be understood that the cover element flange 14a can take on any of a variety of shapes, provided that it extends past the chamfered region 52a and provides protection to it by inhibiting contact with potable or non-potable corrosive media.

Still referring to FIGS. 1B and 1C, the weld 40 of the plumbing fitting 100 can include a heat affected zone ("HAZ") 42 spanning a larger width than the width of the weld 40. In general, the centerline of the HAZ 42 is coincident, or close to coincident, with the centerline 44 of the weld 40. Locational control of the HAZ 42 can be achieved through control of the centerline 44 of the weld 40 and the distance 54 to the interface 52. Further, it is believed that controlling the location of the HAZ 42 to ensure that it does not extend to the interface 52 can improve the mechanical properties and corrosion resistance of the weld 40, leading to a plumbing fitting 100 that is weldable with mechanical integrity and corrosion resistance.

As also shown in FIG. 1C, the HAZ 42 of the weld 40 has an average width 46 that extends past the weld 40. In certain aspects of the plumbing fitting 100 in the disclosure, the average width 46 of the HAZ 42 is maintained at 1000 μm or smaller, 900 μm or smaller, 800 μm or smaller, 700 μm or smaller, 600 μm or smaller, 500 μm or smaller, 400 μm or smaller, 300 μm or smaller, 200 μm or smaller, 100 μm or smaller, 75 μm or smaller, 50 μm or smaller, 25 μm or smaller and all values between these upper limits of the width 46. Further, it is believed that minimizing the average width 46 of the HAZ 42 (e.g., through the use of laser welding processes, arc welding processes with lower energy input levels) can provide further control over the location of the HAZ 42 relative to the interface 52, thus ensuring that the HAZ 42 is not in contact with the interface 52. Still further, aspects of the invention relate to minimizing the average width 46 of the HAZ 42 to reduce the extent or size of the cover element flange 14a needed to protect the chamfered region 52a from corrosion.

Referring again to FIG. 1C, control of the weld 40 and HAZ 42 in the plumbing fitting 100, such that these features are not in contact or minimally in contact with the interface 52, can also be achieved through selection of the alloys used to fabricate the valve body 12 and the cover element 14 (see FIG. 1B) in view of particular thermal properties. According to one embodiment, alloys having a relatively low thermal conductivity (as compared to the thermal conductivity of other alloys suitable for plumbing fittings) can be selected to fabricate the valve body 12 and the cover element 14 that result in a weld 40 having an HAZ 42 with a minimal average width 46, particularly when the weld 40 joining the cover element 14 and the valve body 12 is formed with a butt welding, arc welding (e.g., gas tungsten arc welding ("GTAW"), gas metal arc welding ("GMAW"), tungsten inert gas welding ("TIG"), shielded metal arc welding ("SMAW") etc.) and other comparable welding processes. In other aspects, alloys having a relatively low thermal conductivity can be selected to fabricate the valve body 12 and the cover element 14 to result in a weld 40 having an HAZ 42 with a minimal average width 46 with a laser welding process.

Furthermore, these various welding methods (e.g., butt-welding, arc-welding, tungsten inert gas welding and laser welding) deliver differing levels of energy input to result in the weld 40. For example, the heat intensity associated with arc welding processes can range between $10^6$ and $10^8$ W/m$^2$; and the heat intensity associated with laser beam welding can range between $10^{10}$ and $10^{12}$ W/m$^2$. As the energy inputs and associated heat intensity increases or decreases, depending on the type of welding process (e.g., arc welding or laser welding), the HAZ associated with the weld 40 will be confined to a narrower region or wider HAZ region in terms of the average width 46, respectively (see FIG. 1C). That is, arc welding processes (e.g., GTAW, GMAW, TIG, etc.) tend to produce a wide HAZ 42; and conversely, laser welding processes, with a more concentrated power density, result in a narrower HAZ 42. Accordingly, in certain embodiments, the thickness of the cover element flange 14a can be increased to accommodate the expected increase in the average width 46 of the HAZ 42 of the weld 40 based on the particular welding process selected to create the weld 40. In other embodiments, the thickness of the cover element flange 14a can advantageously be decreased to accommodate the expected decrease in the average width 46 of the HAZ 42 of the weld 40 based on the particular welding process selected to create the weld 40, thus lowering material costs and reducing weight of the fitting 100.

In certain embodiments, the alloys are selected for the valve body 12 and the cover element 14 with a thermal conductivity of less than or equal to 60 W/(m*K), less than or equal to 55 W/(m*K), less than or equal to 50 W/(m*K), less than or equal to 45 W/(m*K), less than or equal to 40 W/(m*K), less than or equal to 35 W/(m*K), less than or equal to 30 W/(m*K), less than or equal to 25 W/(m*K), less than or equal to 20 W/(m*K), less than or equal to 15 W/(m*K), less than or equal to 10 W/(m*K), and all thermal conductivity values between these upper limits. For example, a C87600 Cu—Zn—Si alloy typically has a thermal conductivity of about 28 W/(m*K); and a C69400 Cu—Si alloy typically has a thermal conductivity of about 26 W/(m*K). Other copper alloys with low silicon content (less than 3% by weight) are also suitable with relatively low thermal conductivity levels. For example, a C63000 Cu—Al—Ni alloy typically has a thermal conductivity of about 39 W/(m*K); a C51000 Cu—Sn—P alloy typically has a thermal conductivity of about 40 W/(m*K); and a C64200 Cu—Al alloy has a thermal conductivity of about 45 W/(m*K). Without being bound by theory, it is believed that reducing the thermal conductivity of the alloys employed to fabricate the valve body 12 and the cover element 14 minimizes the conduction of heat within these elements to limit the average width 46 of the HAZ 42 that develops from the welding process, e.g., an arc-welding, butt-welding, laser welding or other similar welding process.

Figure 2C:
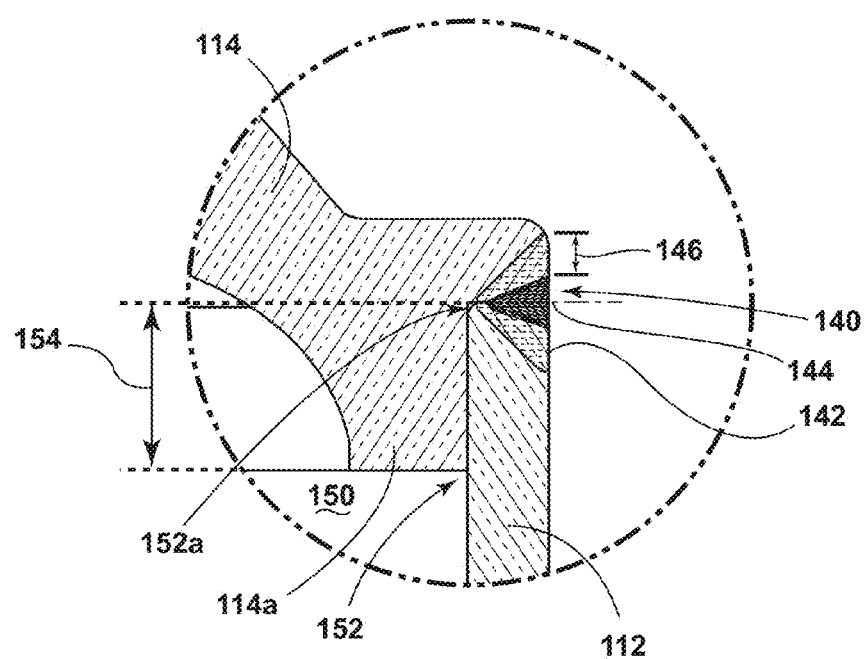
FIG. 2C is an enlarged detailed view of area IIC of the gate valve assembly shown in FIG. 2B.

Referring now to FIGS. 2A, 2B and 2C, a plumbing fitting 200 is depicted in the form of a gate valve that includes a stem 122 and a valve body 112 for receiving the stem. The valve body 112 has a plurality of ends, namely ends 107a and 107b (see FIGS. 2A and 2B). Plumbing fitting 200 includes a cover element 114 (e.g., in the form of a gate valve bonnet, as shown in FIG. 2B) that is joined to the valve body 112 with a weld 140. Further, the weld 140 is located in proximity to and/or spaced from an interface 152 (see FIG. 2C) that is in contact with a potable or non-potable aqueous medium (not shown) that can flow through and/or reside within the waterway portion 150.

In the aspect of plumbing fitting 200 depicted in FIGS. 2A, 2B and 2C, the fitting 200 is a gate valve with a stem 122 that is housed within the cover element 114 (e.g., a gate valve bonnet) and the valve body 112. The stem 122 includes a rising wedge 118 that moves axially into and out of the valve body 112 to open or close the waterway between ends 107a and 107b. Further, the stem 122 is rotatable by a handle 124 through a coupling in the form of a hex nut 126. Rotation of the stem 122 via the handle 124 moves the stem and rising wedge in the axial, vertical direction by virtue of threads on the stem 122 and the cover element 114. In addition, the stem 122 is rotatable and secured within the cover element 114 by virtue of a pack gland 120, stem packing 121 and packing nut 123 (see FIG. 2B).

Referring again to FIGS. 2A and 2B, the plumbing fitting 200 includes a valve body 112 that possesses at least two ends, namely, inlet 107a and outlet 107b. One or both of the ends 107a and 107b can be threaded to allow connection to a conventional threaded pipe fitting. In configurations of the plumbing fitting 200 with one or more unthreaded ends, a pipe connection can be made through an alternative joining approach, such as soldering or brazing.

Further, the primary components of the plumbing fitting 200, including the valve body 112 and the cover element 114, can be fabricated from a lead-free, copper-silicon alloy. Suitable alloys include C87600, C87850, C69400 and other low lead or lead-free bronze compositions. For example, a C87600 composition can be employed for the valve body 112 and the cover element 114 which comprises: 89.9% Cu, 5.1% Zn, 4.4% Si, and 0.052% Pb (by weight). As used herein, "low lead" and "lead-free" alloys employed in the fabrication of the valve body 112 and the cover element 114 contain lead in an amount of less than about 1% by weight and less than 0.25% by weight, respectively. In certain preferred aspects of the plumbing fitting 200, the alloy or alloys employed to fabricate the valve body 112 and the cover element 114 contain less than 0.1% lead by weight or, in some cases, no more than trace levels of lead.

Referring again to FIGS. 2B and 2C, the plumbing fitting 200 includes a weld 140 that joins the cover element 114 to the valve body 112. Further, as shown particularly in FIG. 2C, the weld 140 has a centerline 144 substantially coincident with a chamfered region 152a and that is in proximity to the interface 152, i.e., as defined at the edge of cover element flange 114a. In certain aspects, the weld 140 has a centerline 144 set at a distance 154 of no greater than 10 mm from the interface 152. In other aspects, the centerline 144 of the weld 140 resides at a distance 154 of no greater than 9 mm, 8 mm, 7 mm, 6 mm, 5 mm, 4 mm, 3 mm, 2 mm, 1 mm, 0.5 mm and all values between these upper limits, from the interface 152. In a further aspect, the centerline 144 of the weld 140 is set at a distance 154 of no greater than 6.4 mm, or no greater than 2.5 mm, from the interface. As depicted in FIGS. 2B and 2C, the configuration of the cover element 114 and the valve body 112 in proximity to the interface 152 and weld 140, along with the size of the cover element flange 114a, can be arranged to control the location of the centerline 144 of the weld 140 and/or increase the extent of corrosion protection afforded by the flange 114a over the chamfered region 152a.

Still referring to FIGS. 2B and 2C, the weld 140 of the plumbing fitting 200, like the weld 40 in the plumbing fitting 100, can include a heat affected zone ("HAZ") 142 spanning a larger width than the width of the weld 140. In general, the centerline of the HAZ 142 is coincident or close to coincident with the centerline 144 of the weld 140. Locational control of the HAZ 142 can be achieved through control of the centerline 144 of the weld 140 and the distance 154 to the interface 152. Further, controlling the location of the HAZ 142 to ensure that it does not extend to the interface 152 can improve the mechanical properties and corrosion resistance of the weld 140, leading to a plumbing fitting 200 that is weldable with mechanical integrity and corrosion resistance.

As also shown in FIG. 2C, the HAZ 142 of the weld 140 has an average width 146 that extends past the weld 140. In certain aspects of the plumbing fitting 200 in the disclosure, the average width 146 of the HAZ 142 is maintained at 1000 µm or smaller, 900 µm or smaller, 800 µm or smaller, 700 µm or smaller, 600 µm or smaller, 500 µm or smaller, 400 µm or smaller, 300 µm or smaller, 200 µm or smaller, 100 µm or smaller, 75 µm or smaller, 50 µm or smaller, 25 µm or smaller and all values between these upper limits of the width 146. Further, minimizing the average width 146 of the HAZ 142 (e.g., through the use of laser welding processes, arc welding processes with lower energy input levels) can provide further control over the location of the HAZ 142 relative to the interface 152, thus ensuring that the HAZ 142 is not in contact with the interface 152. Still further, aspects of the invention relate to minimizing the average width 146 of the HAZ 142 to reduce the extent or size of the cover element flange 114a needed to protect the chamfered region 152a from corrosion.

Referring again to FIG. 2C, control of the weld 140 and HAZ 142 in the plumbing fitting 200, such that these features are not in contact or minimally in contact with the interface 152, can also be achieved through selection of the alloys used to fabricate the valve body 112 and the cover element 114 in view of particular thermal properties. According to an embodiment, alloys having a relatively low thermal conductivity can be selected to fabricate the valve body 112 and the cover element 114 that result in a weld 140 having an HAZ 142 with a minimal average width 146, particularly when the weld 140 joining the cover element 114 and the valve body 112 is formed with a butt-welding, arc-welding (e.g., GTAW, GMAW, TIG, SMAW, etc.) and other comparable welding processes. In other aspects, alloys having a relatively low thermal conductivity can be selected to fabricate the valve body 112 and cover element 114 to result in a weld 140 having an HAZ 142 with a minimal average width 146 with a laser welding process.

Furthermore, these various welding methods (e.g., butt-welding, arc-welding, tungsten inert gas welding and laser welding) deliver differing levels of energy input to result in the weld 140. As noted earlier, the heat intensity associated with arc welding processes can range between $10^6$ and $10^8$ W/m$^2$; and the heat intensity associated with laser beam welding can range between $10^{10}$ and $10^{12}$ W/m$^2$. As the energy inputs and associated heat intensity increases or decreases, depending on the type of welding process (e.g., arc welding or laser welding), the HAZ associated with the weld 140 will be confined to a narrower region or wider HAZ region in terms of the average width 146, respectively (see FIG. 2C). That is, arc welding processes (e.g., GTAW, GMAW, TIG, SMAW, etc.) tend to produce a wide HAZ 142; and conversely, laser welding processes, with a more concentrated power density, result in a narrower HAZ 142. Accordingly, in certain embodiments, the thickness of the cover element flange 114a can be increased to accommodate the expected increase in the average width 146 of the HAZ 142 of the weld 140 based on the particular welding process selected to create the weld 140. In other embodiments, the thickness of the cover element flange 114a can advantageously be decreased to accommodate the expected decrease in the average width 146 of the HAZ 142 of the weld 140 based on the particular welding process selected to create the weld 140, thus lowering material costs and reducing weight of the fitting 200.

In certain embodiments, the alloys are selected for the valve body 112 and the cover element 114 with a thermal conductivity of less than or equal to 60 W/(m*K), less than or equal to 55 W/(m*K), less than or equal to 50 W/(m*K), less than or equal to 45 W/(m*K), less than or equal to 40 W/(m*K), less than or equal to 35 W/(m*K), less than or equal to 30 W/(m*K), less than or equal to 25 W/(m*K), less than or equal to 20 W/(m*K), less than or equal to 15 W/(m*K), less than or equal to 10 W/(m*K), and all thermal conductivity values between these upper limits. As noted earlier, a C87600 Cu—Zn—Si alloy typically has a thermal conductivity of about 28 W/(m*K); and a C69400 Cu—Si alloy typically has a thermal conductivity of about 26 W/(m*K). Other copper alloys with low silicon content (less than 3% by weight) are also suitable with relatively low thermal conductivity levels. For example, a C63000 Cu—Al—Ni alloy typically has a thermal conductivity of about 39 W/(m*K); a C51000 Cu—Sn—P alloy typically has a thermal conductivity of about 40 W/(m*K); and a C64200 Cu—Al alloy has a thermal conductivity of about 45 W/(m*K). Without being bound by theory, it is believed that reducing the thermal conductivity of the alloys employed to fabricate the valve body 112 and the cover element 114 minimizes the conduction of heat within these elements to limit the average width 146 of the HAZ 142 that develops from the welding process, e.g., an arc-welding, butt-welding, laser welding or other similar welding process.

Figure 3A:
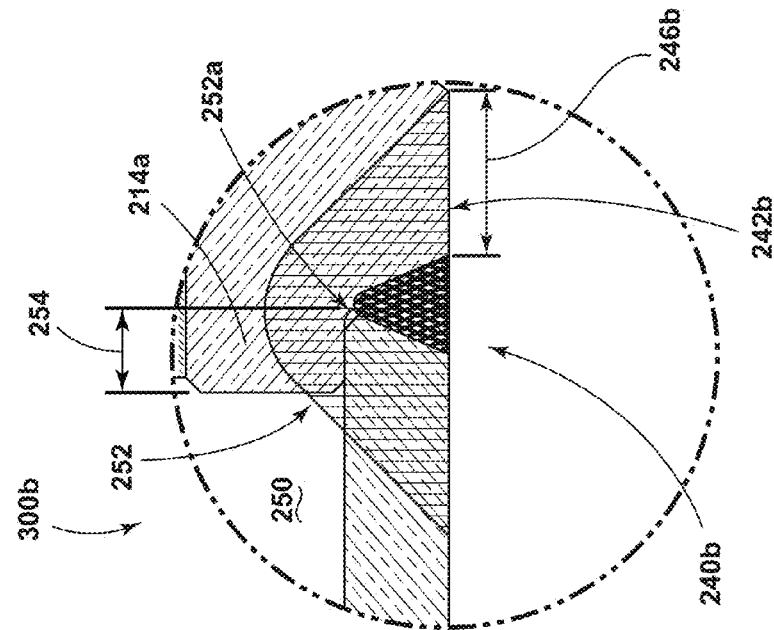
FIG. 3A is an enlarged detailed view of a weld joining the cover element to the body of a plumbing fitting according to an embodiment of the disclosure.
Figure 3B:
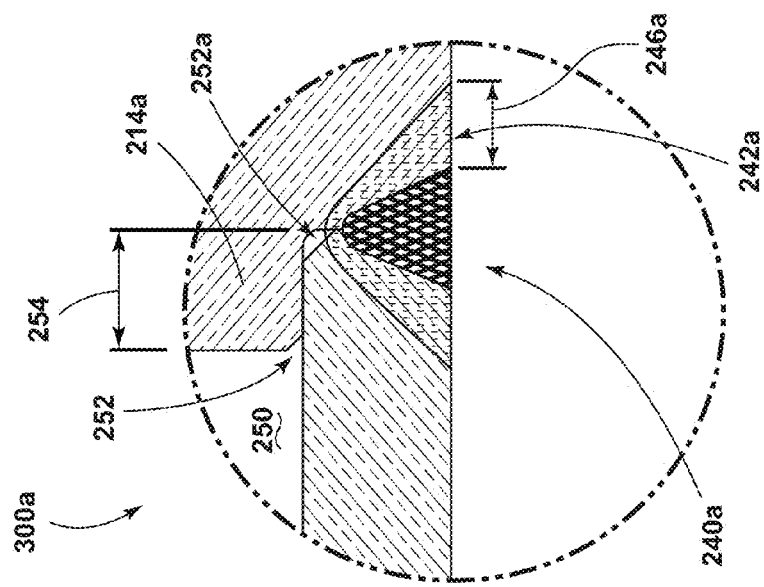
FIG. 3B is an enlarged detailed view of a weld joining the cover element to the body of a comparative plumbing fitting.

Referring to FIG. 3A, an enlarged detailed view of a weld 240a of a plumbing fitting 300a is depicted as joining a first element (e.g., a cover element of a check valve, an end of an elbow) to a second feature (e.g., a fitting body) of the fitting 300a according to another aspect of the disclosure. In general, the plumbing fitting 300a is comparable to the exemplary plumbing fittings 100 (e.g., a ball valve) and 200 (e.g., a gate valve) depicted in FIGS. 1A-1C and 2A-2C, respectively. Plumbing fitting 300a is also indicative of other plumbing fittings according to the disclosure including but not limited to elbows, check valves and other fittings without stems (not shown). For example, in certain types of fittings without stems, the weld 240a joins a fitting body having one or more ends for transmitting a potable aqueous media to a cover element (e.g., a check valve). As another example, a weld 240a can join an end (or each end) of a fitting body (e.g., an elbow or other fitting lacking a valve and/or stem). That is, the plumbing fitting 300a is configured according to the foregoing principles—i.e., it has mechanical integrity and corrosion resistance indicative of a weld 240a in proximity to a potable or non-potable medium carried by the fitting but having a heat affected zone that is not in contact with it. More particularly, the weld 240a includes a heat affected zone 242a with an average width 246a. Further, the centerline of the weld 240a is substantially coincident with a chamfered region 252a. The centerline of the weld 240a is also located in proximity to an interface 252, which is in contact with a portion of waterway 250 and defined at the edge of flange 214a. The flange 214a is set off from a distance 254 or less from the interface 252. In contrast, FIG. 3B is an enlarged detailed view of a weld joining a first and second feature of a comparative plumbing fitting 300b. The plumbing fitting 300b is comparative in the sense that it contains a weld 240b that is formed without the control and principles outlined in the foregoing. In particular, the weld 240b has a heat affected zone 242b that overlaps with the interface 252 in contact with a portion of waterway 250. That is, the average width 246b of the heat affected zone 242b extends past the interface 252 such that the heat affected zone is in contact with a potable or non-potable aqueous medium within the portion of the waterway 250. Further, as the heat affected zone 242b extends past the flange 214a (see FIG. 3B), the flange 214a offers no significant corrosion protection to the chamfered region 252a.

Figure 4B:
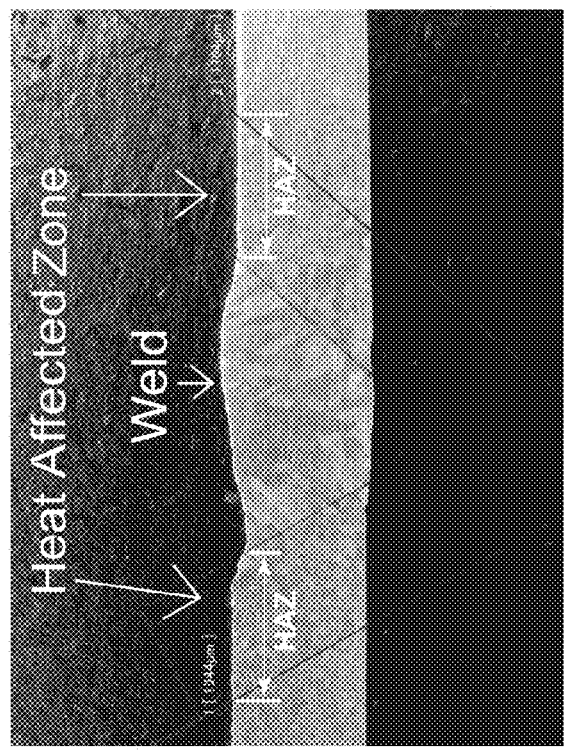
FIG. 4B is an optical micrograph of a cross-section of a weld joining a cover element without a cover element flange to the body of a comparative plumbing fitting.
Figure 4A:
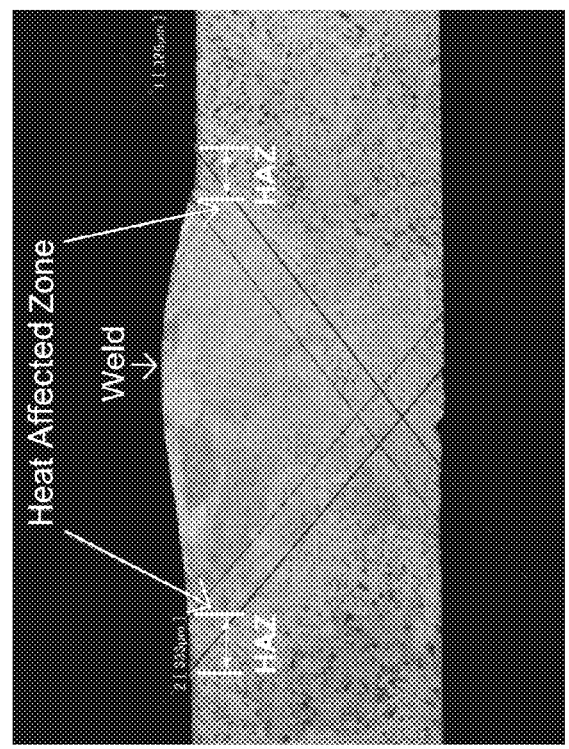
FIG. 4A is an optical micrograph of a cross-section of a weld joining a cover element without a cover element flange to the body of a plumbing fitting according to an embodiment of the disclosure.

Referring to FIG. 4A, an optical micrograph of a cross-section of a weld joining the cover element to the body (e.g., a valve body or fitting body to a cover element that lacks a cover element flange) of a plumbing fitting is provided, according to an embodiment of the disclosure. In particular, the weld formed in the sample depicted in FIG. 4A with a GTAW process joins a cover element and valve body formed from a C87600 alloy having a thermal conductivity of about 28.4 W/(m*K). As shown, the as-formed weld possesses a relatively small HAZ with an average width of about 326 to 333 μm. A modest cover element flange, for example, could be added to the cover element to protect a chamfered region and the HAZ from corrosion.

In contrast, FIG. 4B presents an optical micrograph of a cross-section of a weld joining the cover element to the body of a comparative plumbing fitting. For the sample depicted in FIG. 4B, the weld is formed with a similar set of GTAW process conditions as employed in the sample shown in FIG. 4A. However, for the sample shown in FIG. 4B, the weld joins a cover element (without a cover element flange) and valve body that were fabricated from a C12200 copper alloy with residual phosphorous having a thermal conductivity of about 340 W/(m*K). As shown in FIG. 4B, the as-formed weld possesses a large HAZ with an average width of about 1704 to 1944 μm. As a result, an extremely large and impractical cover element flange would be required to protect the chamfered region and this large HAZ from corrosion. In addition, the HAZ of the weld depicted in FIG. 4B has significantly less uniformity with regard to its average width compared to the HAZ of the weld of the sample depicted in FIG. 4A.

Referring now to FIG. 5, a schematic flow chart of a method 400 of making a plumbing fitting (e.g., a gate valve, ball valve, check valve and other stemless fittings) is provided, according to another embodiment of the disclosure. More particularly, the method 400 can be employed to fabricate the plumbing fittings 100, 200 and 300a depicted according to the foregoing aspects of the disclosure, or fitting 500, also consistent with the foregoing principles. As shown in exemplary form in FIG. 5, the method 400 can include a step 402 for inserting a valve into a valve body and a step 404 for inserting a stem into the valve and the valve body. Note that when the method 400 is employed to make plumbing fitting lacking a valve and/or a stem, portions or all of step 402 would necessarily be omitted from the overall method 400.

Again referring to FIG. 5, the method 400 can also include a step 406 for arranging a cover element in close proximity to the valve body (or fitting body) to define an interface. Further, the interface is defined such that it is in contact with a potable or non-potable aqueous medium (e.g., potable or non-potable water that flows within the fitting formed by the method 400). Substep 405a can be employed as part of step 406 to dimension or otherwise configure the cover element, valve body and cover element flange (as applicable) to ensure that the weld formed later in the method 400 is located in relative proximity to the interface, while at a sufficient distance to ensure that its HAZ, along with any chamfered region (e.g., between the cover element and valve body) is not in contact with the potable or non-potable aqueous medium. Similarly, substep 405*b* can be employed as part of step 406 to select the thermal properties of the cover element and body to ensure that the weld formed later in the method 400 includes an HAZ that is not in contact with the potable or non-potable aqueous medium.

Still referring to FIG. 5, the method 400 also includes a step 408 for welding the cover element to the valve body (or fitting body). In step 408, the welding is conducted such that the resulting weld is located in proximity to and spaced from the interface (e.g., an interface in contact with the potable or non-potable aqueous medium). As also shown in FIG. 5, the step 408 can include a substep 407, the substep 407 includes various welding parameters that can be employed to influence the size and location of the weld and its HAZ (e.g., GTAW input energy, travel speed and others) in association with configuring the interface and/or thermal properties of the features to be joined by the weld for purposes of controlling its location and the size and position of its HAZ.

In certain preferred aspects, the weld of the fittings 100, 200, 300*a* and 500 fabricated with the method 400 includes a centerline that is 6.4 mm, or 2.5 mm or less, from the interface. In other aspects, the weld has a centerline that is no greater than 9 mm, 8 mm, 7 mm, 6 mm, 5 mm, 4 mm, 3 mm, 2 mm, 1 mm, 0.5 mm and all values between these upper limits from the interface. In another preferred aspect, the weld has an HAZ with an average width of 600 μm or less, or 400 μm or less. In other aspects, the average width of the HAZ is held to 1000 μm or smaller, 900 μm or smaller, 800 μm or smaller, 700 μm or smaller, 600 μm or smaller, 500 μm or smaller, 400 μm or smaller, 300 μm or smaller, 200 μm or smaller, 100 μm or smaller, 75 μm or smaller, 50 μm or smaller, 25 μm or smaller and all values between these upper limits. Similarly, the features to be joined by such welds (e.g., cover element and valve body) can be selected with a relatively low thermal conductivity—i.e., less than or equal to 60 W/(m*K), less than or equal to 55 W/(m*K), less than or equal to 50 W/(m*K), less than or equal to 45 W/(m*K), less than or equal to 40 W/(m*K), less than or equal to 35 W/(m*K), less than or equal to 30 W/(m*K), less than or equal to 25 W/(m*K), less than or equal to 20 W/(m*K), less than or equal to 15 W/(m*K), less than or equal to 10 W/(m*K), and all thermal conductivity values between these upper limits

EXAMPLES

The following examples represent certain non-limiting embodiments of the disclosure.

Example 1

In this example, a set of four plumbing fittings (e.g., comparable to fitting 100) are welded with a GTAW process to demonstrate the effect of welding parameters on the width and depth of the weld and its HAZ, along with the influence of these factors on the size and configuration of the cover element to protect a chamfered region from corrosion. Cross-sections of the resulting welds are depicted in FIGS. 6A-6D, which were conducted at 50 amps, 75 amps, 100 amps, and 125 amps, respectively, with a GTAW welder. Each plumbing fitting includes: a stem, a valve body (e.g., valve body 12) for receiving a stem and a valve, the body having a plurality of ends; and a cover element (e.g., cover element 14) joined to the body with a weld (e.g., weld 40) in proximity to and spaced from a chamfered region (e.g., chamfered region 52*a*) and an interface (e.g., interface 52) in contact with a potable or non-potable aqueous medium. Further, the body and the cover element are fabricated from a lead-free, copper-silicon alloy, C69400, having a thermal conductivity of about 26 W/(m*K) and the following composition: 80.59% Cu, 14.8% Zn, 4.42% Si, and 0.066% Pb (by weight). In addition, the cover elements of the fittings depicted in FIGS. 6A-6D were purposely fabricated without a cover flange element (see, e.g., FIG. 1C, element 14*a*) to aid in illustrating the need for this feature in view of the extent and size of the resulting welds and their respective HAZs.

Figure 6A:
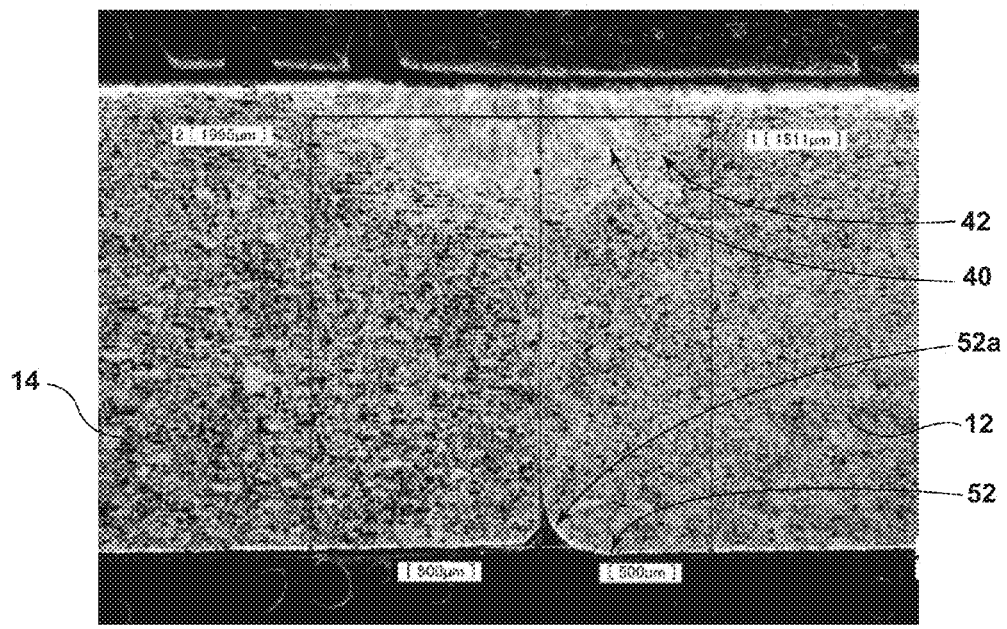
FIGS. 6A-6D are a series of optical micrographs depicting plumbing fittings with valve bodies and cover elements without cover element flanges that are welded with a gas tungsten arc welding ("GTAW") process at energies of 50 amps, 75 amps, 100 amps and 125 amps, according to embodiments of the disclosure.
Figure 6B:
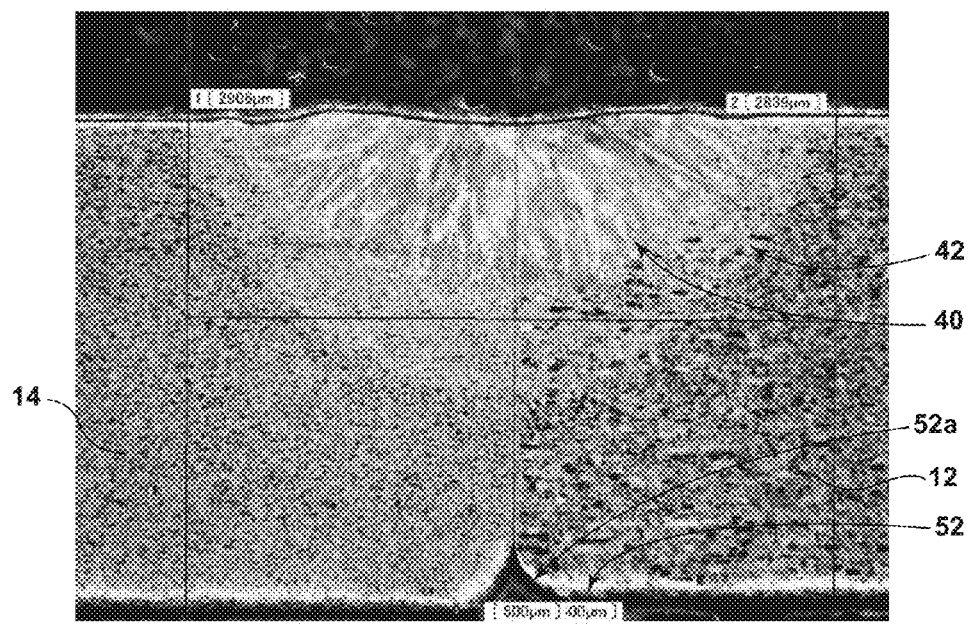

As is evident from FIGS. 6A through 6D, the size and the extent of the weld and its HAZ increases as a function of increasing GTAW energy inputs. In FIGS. 6A and 6B, the full width of the HAZs associated with these welds is about 3.5 mm and 5.7 mm as conducted at 50 amps and 75 amps, respectively. As is also evident in FIGS. 6A and 6B, the depth of the welds and the HAZs do not extend completely through the joint in proximity to the chamfered region (52*a*) and the interface (52). Accordingly, a cover element flange (not shown in FIGS. 6A and 6B) would only be necessary between the interface and chamfered region, about 0.5 mm as shown in FIGS. 6A and 6B. Advantageously, the configuration of the plumbing fitting, particularly its cover element flange, can be adjusted to minimize the extent and size of the cover element flange, thus reducing weight and cost of the fitting.

Figure 6C:
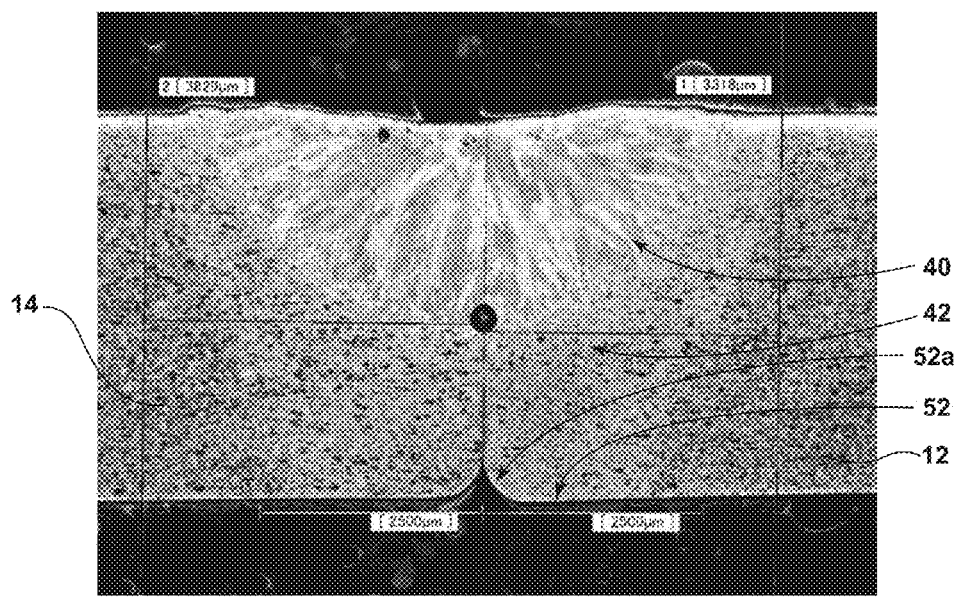
Figure 6D:
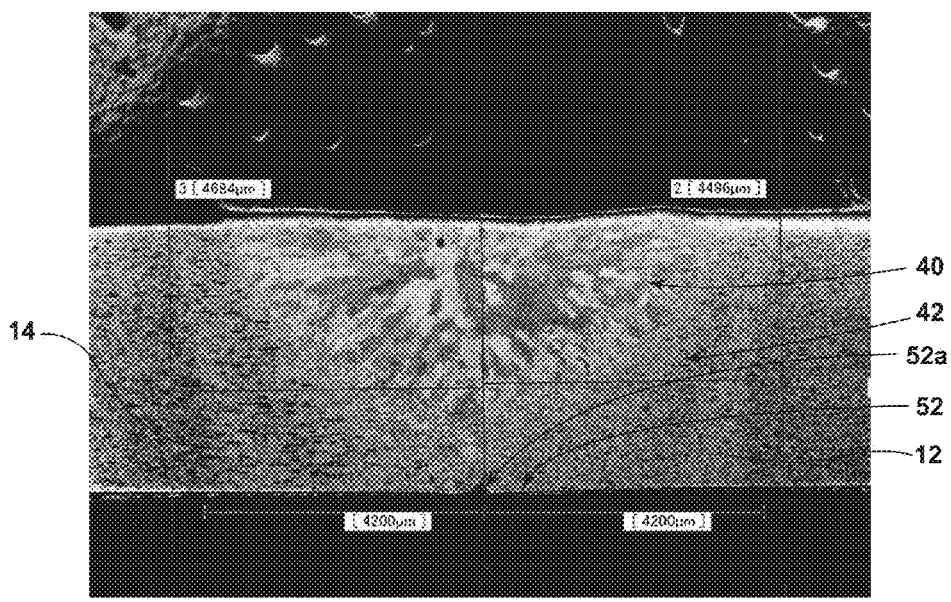

With regard to FIGS. 6C and 6D, the full width of the HAZs associated with these welds is about 7.1 mm and 9.2 mm as conducted at 100 amps and 125 amps, respectively. As is also evident from FIGS. 6C and 6D, the depth of the welds extends much closer to the chamfered region (52*a*) and interface (52), which tends to result in a stronger joint. Further, the depth of the HAZs extends up to the chamfered region (52*a*). Accordingly, a cover element flange (not shown in FIGS. 6C and 6D) would be necessary (e.g., for purposes of preventing ingress of potable or non-potable media into the weld via the chamfered region) between the chamfered region (52*a*) and interface (52), well past the chamfered region. As shown in FIGS. 6C and 6D, a cover element flange that extends 2.5 mm and 4.2 mm from the chamfered region, respectively, can effectively 'cover' the HAZ and ensure that the chamfered region is adequately protected from potentially corrosive non-potable or potable media.

Example 2

Figure 7A:
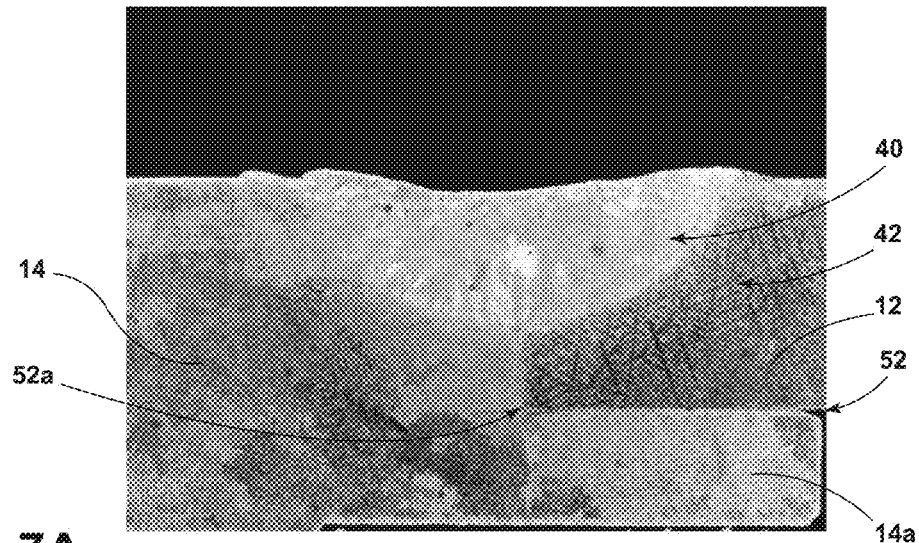
FIG. 7A is an optical micrograph depicting a plumbing fitting with a valve body and cover element having a cover element flange that is welded with a GTAW process comparable to the fittings depicted in FIGS. 6A and 6B, according to an embodiment of the disclosure.

In this example, as shown in FIG. 7A, a plumbing fitting (e.g., comparable to fitting 100) is configured with the same features and alloy compositions as the fittings in Example 1, along with a cover element flange (e.g., cover element flange 14*a*) and welded with a GTAW process using parameters similar to those used for the welds depicted in FIGS. 6A and 6B (e.g., between about 50 amps and 75 amps). However, in this example, the cover element flange is extended well past the chamfered region (e.g., region 52*a*) and width of the HAZ to advantageously add additional support to the weld and form an extended interface (e.g., interface 52). As noted earlier, an incomplete bond or weld of the joined pieces (e.g., a valve body and cover element) can result in a relatively weaker weld that can be more susceptible to mechanical failure and/or corrosion from aqueous potable or non-potable media. As shown in FIG. 7A, however, the added length of the cover element flange past the width of the HAZ provides added support to a weld that may be less than 100% complete. Another benefit of this plumbing fitting configuration is that it offers added manufacturing robustness to account for variable energy inputs (e.g., within a given process window), which can significantly change the completeness and extent of the weld and the HAZ.

Example 3

Figure 7B:
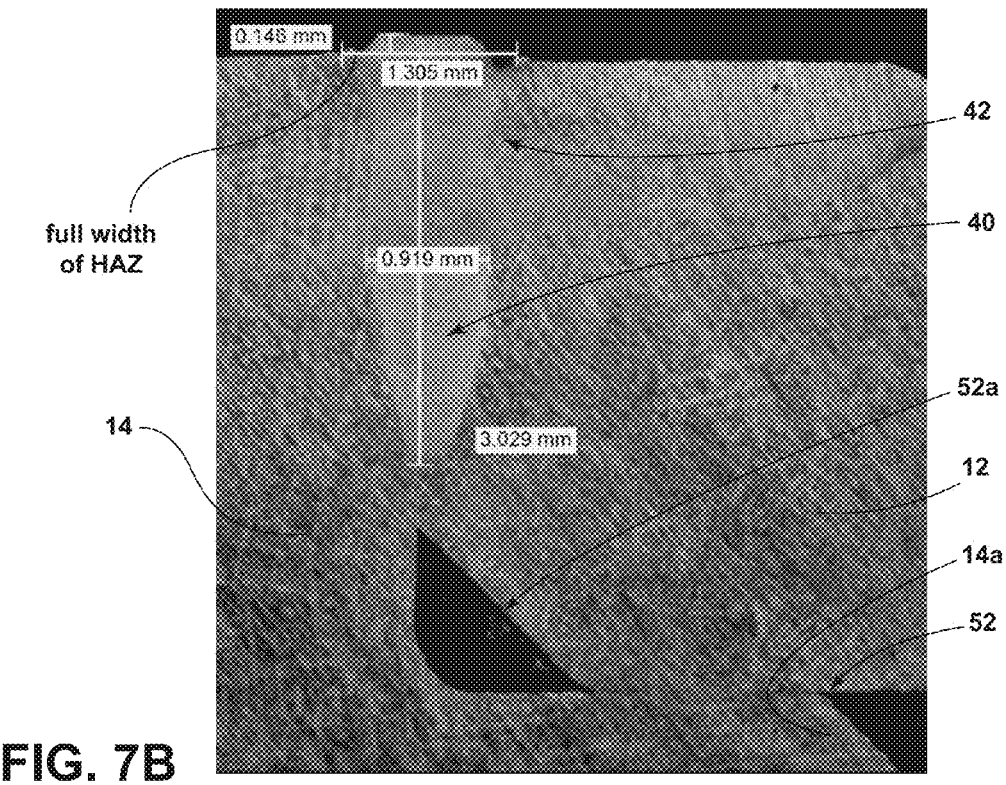
FIG. 7B is an optical micrograph depicting a plumbing fitting with a valve body and cover element having a cover element flange that is welded with a laser welding process, according to an embodiment of the disclosure.

In this example, as shown in FIG. 7B, a plumbing fitting (e.g., comparable to fitting 100) is configured with the same features and alloy compositions as the fittings in Example 1, along with a cover element flange (e.g., cover element flange 14a) and welded with a laser welding process with suitable energy inputs to produce the weld shown (e.g., between about $10^{10}$ and about $10^{12}$ W/m$^2$). More particularly, the laser weld depicted in FIG. 7B was conducted with a spot size of about 200 microns, a focus position of about −6 mm, a power of 2 kW and a surface speed of 3.32 m/min. As noted earlier, a laser welding process employed in the fittings of the disclosure (e.g., with low lead or lead-free copper or copper-silicon alloys) can advantageously produce a weld with significant penetration (e.g., about 3.029 mm as shown in FIG. 7B) while having a narrow width (e.g., about 0.919 mm, as shown in FIG. 7B) and narrow HAZ (e.g., about 1.305 mm as shown in FIG. 7B). In addition, the weld produced by the laser weld process has a convex-shaped portion (e.g., about 0.146 mm in height, as shown in FIG. 7B).

In this example, however, the cover element flange is extended well past the chamfered region (e.g., region 52a) and width of the HAZ to advantageously add additional support to the weld and form an extended interface (e.g., interface 52). In this case, as shown in FIG. 7B, the weld is complete (e.g., near to full penetration) but the extended cover element flange advantageously offers additional safety margin for the weld by providing additional support to it. Another benefit of this plumbing fitting configuration is that it offers added manufacturing robustness to account for variable energy inputs (e.g., within a given process window) associated with a laser welding process, which can significantly change the completeness and extent of the weld and the HAZ. In addition, it is also evident from FIG. 7B that a laser welding process, when optimized for a given fitting geometry and material compositions for the valve body and cover element, affords the plumbing fittings of the disclosure flexibility in reducing the extent of the cover element flange (or, in some cases, eliminating it) to save weight and material cost.

Example 4

Figure 8A:
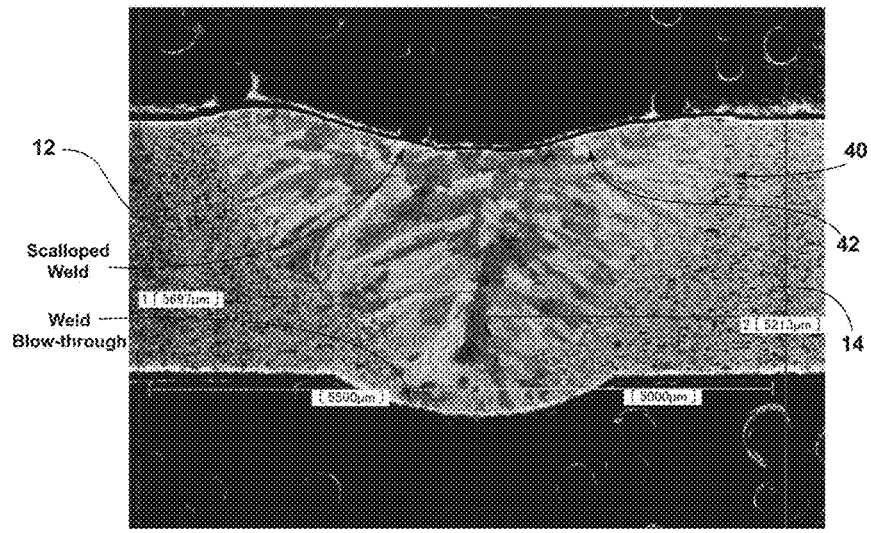
FIG. 8A is an optical micrograph depicting a plumbing fitting with a valve body and cover element without a cover element flange that is welded with a GTAW process in excess of 125 amps, according to an embodiment of the disclosure.
Figure 8B:
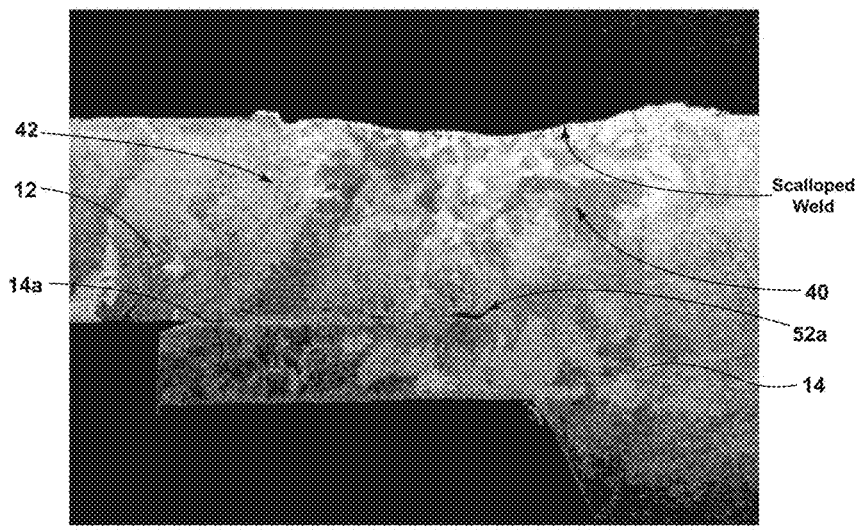
FIG. 8B is an optical micrograph depicting a plumbing fitting with a valve body and cover element with a cover element protective flange that is welded with the same GTAW process employed in welding the fitting depicted in FIG. 8A, according to an embodiment of the disclosure.

In this example, as shown in FIGS. 8A and 8B, two plumbing fittings (e.g., comparable to fitting 100) are configured with the same features and alloy compositions as the fittings in Example 1, and were both welded with a GTAW process using parameters somewhat more aggressive (i.e., greater than 125 amps) than those used for the weld depicted in FIG. 6D (i.e., about 125 amps). The fitting depicted in FIG. 8A does not include a cover element flange. In contrast, the fitting depicted in FIG. 8B includes a cover element flange. As is evident from FIG. 8A, the weld formed by these parameters is complete and the HAZ is fairly large at about 10.9 mm. However, the weld associated with the fitting shown in FIG. 8A is not ideal in the sense that it exhibits some degree of material 'blow-through' (and scalloping on the opposing side of the weld), which can negatively reduce the cross-sectional length of the weld and its mechanical integrity. Advantageously, the fitting depicted in FIG. 8B includes a cover element flange, sized to accommodate the HAZ and manage material 'blow-through' associated with higher energy input weld process conditions. That is, the cover element flange in the fitting depicted in FIG. 8B serves to protect the chamfered region (e.g., region 52a) from corrosion from non-potable or potable media and, additionally, provides added protection from 'blow-through' welding conditions. Hence, certain embodiments of the plumbing fittings of the disclosure, by virtue of a cover element flange, offer added processing-related robustness given that these fittings can even accommodate high energy welding conditions within or even outside of a given process window.

It should also be understood that variations and modifications can be made to the aforementioned structures and methods without departing from the concepts of the present invention. For example, the ball valve and gate valve depicted in FIGS. 1A-1C and 2A-2C, respectively, are merely exemplary. Other plumbing fittings and components (e.g., a check valve and other stemless fittings) can be designed and/or made according to aspects of the disclosure with mechanical integrity and corrosion resistance that contain one or more such welds with positional and/or size control. Similarly, the flanges 14a and 114a of the fittings 100, 200 depicted in FIGS. 1C and 2C can take on any of a variety of shapes to, for example, provide support beneath the weld during its formation, and/or more effectively cover the chamfered region 52a and 152a (or similar feature potentially susceptible to corrosion) in view of the shape and dimensions of the region and the HAZ 42, 142. Further, the foregoing concepts are intended to be covered by the following claims, unless these claims by their language expressly state otherwise.

Other variations and modifications can be made to the aforementioned structures and methods without departing from the concepts of this disclosure. These concepts, and those mentioned earlier, are intended to be covered by the following claims unless the claims by their language expressly state otherwise.

What is claimed is:

1. A plumbing fitting, comprising:
   a stem;
   a valve body for receiving a stem and a valve, the body having a plurality of ends; and
   a cover element joined to the body with a weld in proximity to and spaced from an interface in contact with a potable or non-potable aqueous medium,
   wherein the body and the cover element are fabricated from a low lead or lead-free, copper-silicon or copper alloy having a thermal conductivity of ≤45 W/(m*K), and
   further wherein the weld has a centerline that is ≤6.4 mm from the interface.

2. The fitting according to claim 1, wherein the weld has a centerline that is ≤2.5 mm from the interface.

3. The fitting according to claim 2, wherein the weld further comprises a heat affected zone that has an average width ≤600 μm and is spaced from the interface.

4. The fitting according to claim 3, wherein the body and the cover element are fabricated from a low lead or lead-free, copper-silicon or copper alloy having a thermal conductivity of ≤30 W/(m*K).

5. The fitting according to claim 1, wherein the cover element comprises a cover element flange and the flange comprises the interface.

6. The fitting according to claim 1; wherein the cover element is an end cover and the body is a ball valve body, the end cover joined to the body at an end.

7. The fitting according to claim 1, wherein the cover element is a gate valve bonnet and the valve body is a gate valve body.

8. A plumbing fitting, comprising:
a stem;
a valve body for receiving a stem and a valve, the body having a plurality of ends; and
a cover element joined to the body with a weld in proximity to and spaced from an interface in contact with a potable or non-potable aqueous medium,
wherein the body and the cover element are fabricated from a low lead or lead-free, copper-silicon or copper alloy having a thermal conductivity of ≤45 W/(m*K),
wherein the weld has a heat affected zone that has an average width ≤400 μm and is spaced from the interface, and
further wherein the weld further comprises a centerline that is ≤6.4 mm from the interface.

9. The fitting according to claim 8, wherein the weld further comprises a centerline that is ≤2.5 mm from the interface.

10. A plumbing fitting, comprising:
a fitting body having a plurality of ends; and
a cover element or an end element joined to the body with a weld in proximity to and spaced from an interface in contact with a potable or non-potable aqueous medium,
wherein the body, and the cover element or the end element, are fabricated from a low lead or lead-free, copper-silicon or copper alloy having a thermal conductivity of ≤45 W/(m*K),
wherein the weld has a heat affected zone that has an average width ≤400 μm and is spaced from the interface, and
further wherein the weld further comprises a centerline that is ≤6.4 mm from the interface.

11. The fitting according to claim 10, wherein the weld further comprises a centerline that is ≤2.5 mm from the interface.

12. The fitting according to claim 10, wherein the cover element comprises a cover element flange and the flange comprises the interface.

13. A method of making a plumbing fitting, comprising the steps:
inserting a valve into a valve body;
inserting a stem into the valve and the valve body;
arranging a cover element in close proximity to the valve body to define an interface, the interface being in contact with a potable or non-potable aqueous medium; and
welding the cover element to the valve body, the welding conducted to form a weld located in proximity to and spaced from the interface, the weld further comprising a centerline that is ≤6.4 mm from the interface,
wherein the body and the cover element are fabricated from a lead-free or low lead, copper-silicon or copper alloy having a thermal conductivity of ≤45 W/(m*K).

14. The method according to claim 13, wherein the weld further comprises a heat affected zone that has an average width ≤600 μm and is spaced from the interface.

15. The method according to claim 13, wherein the weld further comprises a heat affected zone that has an average width ≤400 μm and is spaced from the interface.

16. The method according to claim 15, wherein the body and the cover element are fabricated from a lead-free or low lead, copper-silicon or copper alloy having a thermal conductivity of ≤30 W/(m*K).

17. The method according to claim 16, wherein the cover element comprises a cover element flange and the flange comprises the interface.

18. The method according to claim 17, wherein the cover element and valve body are collectively configured such that the weld is located in proximity to the interface and the centerline is ≤2.5 mm from the interface.

* * * * *